United States Patent [19]
Iida et al.

[11] Patent Number: 5,797,367
[45] Date of Patent: Aug. 25, 1998

[54] CONTROL APPARATUS FOR AN IN-CYLINDER INJECTION INTERNAL COMBUSTION ENGINE

[75] Inventors: Kazumasa Iida; Katsuhiko Miyamoto; Hitoshi Kamura, all of Kyoto; Hiroki Tamura, Aichi; Atsuyoshi Kojima, Toyota, all of Japan

[73] Assignee: Mitsubishi Jidosha Kogyo Kabushiki Kaisha, Tokyo, Japan

[21] Appl. No.: 907,510

[22] Filed: Aug. 8, 1997

[30] Foreign Application Priority Data

Aug. 9, 1996 [JP] Japan .................... 8-210805
Nov. 12, 1996 [JP] Japan .................... 8-300483

[51] Int. Cl.$^6$ ................ F02B 17/00; F02B 5/00
[52] U.S. Cl. ....................... 123/295; 123/305
[58] Field of Search ................ 133/295, 299, 133/301, 305

[56] References Cited

U.S. PATENT DOCUMENTS 4,955,339  9/1990  Sasaki et al. ............... 123/295
5,313,920  5/1994  Matsushita .................. 123/295
5,722,362  3/1998  Takano et al. ............... 123/295

FOREIGN PATENT DOCUMENTS

4183924A  6/1992  Japan .
5240044A  9/1993  Japan .

Primary Examiner—Thomas N. Moulis

[57] ABSTRACT

An engine control unit of a control apparatus for an in-cylinder injection internal combustion engine sets a fuel injection timing for a compression-stroke injection mode in accordance with a fuel injection quantity, and corrects the fuel injection timing according to an engine cooling water temperature. When the cooling water temperature is lower than a temperature observed when a warm-up operation is completed, the fuel injection timing for the compression-stroke injection mode is corrected for advance or retard on the basis of the engine characteristic proper, and fuel is injected at an appropriate time such that the fuel evaporation rate and the fuel stratification degree which permit the stabilized combustion of the fuel injected into the combustion chamber are attained, whereby the fuel is evaporated satisfactorily. Thus, the occurrence of misfire and the emission of harmful gas components can be restrained effectively during the warm-up operation in the compression-stroke injection mode.

6 Claims, 9 Drawing Sheets

FIG. 14 ance with the operating state of the engine; injection start

CONTROL APPARATUS FOR AN IN-CYLINDER INJECTION INTERNAL COMBUSTION ENGINE

BACKGROUND OF THE INVENTION

1. Field of the Invention

The present invention relates to a control apparatus for an internal combustion engine mounted in an automobile or the like, and more particularly, to a control apparatus that enables an in-cylinder injection internal combustion engine adapted to inject fuel directly into a combustion chamber to perform steady operation with a lean air-fuel ratio for a compression-stroke injection mode, in particular, even when the engine temperature is low, that is, during warm-up operation, for example.

2. Related Art

In order to improve the fuel-efficiency and the like, novel internal combustion engines have recently been developed and started to be practically used that are operable with an air-fuel ratio leaner than a stoichiometric air-fuel ratio. For example, there have been proposed various in-cylinder injection engines of a multicylinder type, in which fuel is injected directly into a combustion chamber (e.g., Jpn. Pat. Appln. KOKAI Publication No. 5-240044). The engines of this type have their combustion chamber configuration, intake port shape, fuel injection system, etc. elaborated so that they are operable both in an intake-stroke injection mode where the fuel is injected mainly in an intake stroke and in a compression-stroke injection mode where the fuel is injected mainly in a compression stroke. Also, an intake-stroke lean air-fuel ratio mode (hereinafter referred to as intake lean mode) and a compression-stroke lean air-fuel ratio mode (hereinafter referred to as compression lean mode) are set for lean air-fuel ratio operation in the intake- and compression-stroke injection modes, respectively. One of these injection modes is selected in accordance with the operating state of the engine.

During the engine operation in the compression lean mode, the fuel injected into the combustion chamber is carried toward a spark plug by an intake air flow, and forms a layer of an air-fuel mixture with a high fuel density around the plug at the ignition timing. As a result, the ignitability of the mixture around the spark plug is improved, and therefore, a stabilized combustion is ensured because flames produced around the spark plug propagate throughout the cylinder even though the air-fuel ratio of the mixture in the cylinder as a whole is lean. Thus, the fuel-efficiency and other characteristics are improved.

In relation to the stabilized combustion, according to a typical in-cylinder injection gasoline engine, the valve-opening time of each fuel injection valve is first set in accordance with the fuel pressure and a required fuel injection quantity. Then, an injection termination timing is determined such that the fuel injection terminates during the intake or compression stroke. Further, an injection start timing is determined in accordance with the valve-opening time and the injection termination timing. In the compression-stroke injection mode, in particular, the injection start and termination timings are determined in consideration of the necessary times for the evaporation of the fuel and the diffusion of a spray of the fuel, in order to evaporate the fuel securely before the time of ignition, thereby ensuring perfect combustion.

If a warm-up operation that directly follows cold starting is carried out in the intake or compression lean mode, however, a misfire may be caused or the emission of unburned hydrocarbon may increase, in some cases. According to the conventional in-cylinder injection engine, therefore, the warm-up operation is prohibited in the intake and compression lean modes. Accordingly, the warm-up operation is performed in a stoichiometric or rich air-fuel ratio mode that entails a large fuel injection quantity, with the engine operation in a lean air-fuel ratio mode for improvement of fuel efficiency kept prohibited.

Accordingly, the reduction of the emission of harmful gas components, improvement of the fuel-efficiency, etc. are positively expected to be achieved by setting the compression-stroke injection mode also for the warm-up operation.

In consideration of these circumstances, there has been proposed a technique for operating an in-cylinder injection engine in the compression-stroke injection mode when the in-cylinder temperature is low or when the engine is cold, for example (Jpn. Pat. Appln. KOKAI Publication No. 4-183924). According to this technique, both the fuel injection timing and the ignition timing are advanced to form a flame kernel in an early stage. By doing this, the in-cylinder temperature is raised to accelerate the evaporation of the fuel, so that a satisfactory air-fuel mixture is formed. Even in the case of the in-cylinder injection engine based on this proposed technique, however, a misfire may possibly be caused during the engine operation in the compression-stroke injection mode when the in-cylinder temperature is low.

The inventors hereof made a study on this problem, and found that the fuel evaporation speed and fuel spray diffusion speed for the compression-stroke injection mode can be changed under the influence of the in-cylinder temperature. Thus, a misfire or an increase of the emission of harmful gas components, which is caused at a low engine temperature, e.g., during the warm-up operation, may be attributed to insufficient fuel evaporation at the low engine temperature or low in-cylinder temperature, and therefore, to difficulty in forming an appropriate stratified air-fuel mixture around the spark plug. In other words, there has not hitherto been established a technique for optimizing the fuel injection timing in consideration of the influence of the in-cylinder temperature on the fuel evaporation speed and fuel spray diffusion speed.

SUMMARY OF THE INVENTION

An object of the present invention is to provide a control apparatus for an internal combustion engine, which permits engine operation in a lean air-fuel ratio mode even when the engine temperature is low, so that the fuel-efficiency can be improved.

Another object of the invention is to provide a control apparatus for an in-cylinder injection internal combustion engine, capable of effectively suppressing the occurrence of a misfire and the emission of harmful gas components during engine operation in a compression-stroke injection mode, irrespective of the engine operating state.

According to the present invention, there is provided a control apparatus for an in-cylinder injection internal combustion engine which has a fuel injection device for injecting fuel directly into a combustion chamber and which is operable in an intake-stroke injection mode where the fuel is injected mainly in an intake stroke and in a compression-stroke injection mode where the fuel is injected mainly in a compression stroke.

The control apparatus of the invention comprises: injection mode selection means for selecting an injection mode in accordance with an operating state of the internal combustion engine; injection timing setting means for setting a reference injection timing, indicative of a fuel injection start or termination timing, in accordance with the injection mode selected by the injection mode selection means, and for correcting the thus set reference injection timing so as to obtain such a fuel evaporation rate and a fuel stratification degree as to ensure stabilized combustion of the fuel injected into the combustion chamber when the injection mode selection means selects the compression-stroke injection mode, the fuel evaporation rate and the fuel stratification degree varying in dependence on an engine temperature; and fuel injection control means for controlling the fuel injection device in accordance with the reference injection timing set or corrected by the injection timing setting means.

According to the control apparatus of the invention constructed in this manner, when the compression-stroke injection mode is selected, the reference injection timing set in accordance with the compression-stroke injection mode thus selected is corrected, whereby such a fuel evaporation rate and a fuel stratification degree as to ensure a stabilized combustion of the fuel can be obtained. As a result, the states of fuel evaporation and fuel spray diffusion in the compression-stroke injection mode can be optimized, so that an air-fuel mixture having an optimum air-fuel ratio can be formed locally around a spark plug when it is ignited. Thus, the occurrence of a misfire and the emission of harmful gas components can be suppressed effectively.

Preferably, the control apparatus further comprises temperature detection means for detecting the engine temperature. The injection timing setting means includes: correction factor storage means for storing a first correction factor set in advance as a function of the engine temperature and used to obtain the fuel evaporation rate and the fuel stratification degree which permit the stabilized combustion of the fuel injected into the combustion chamber; first correction factor determination means for determining, from the correction factor storage means, the first correction factor suited to the engine temperature detected by the temperature detection means; and injection timing correction means for correcting the reference injection timing with use of the first correction factor, determined by the first correction factor determination means, when the engine temperature detected by the temperature detection means is equal to or lower than a predetermined temperature.

According to the preferred arrangement described above, the injection timing setting means can make the correction of the reference injection timing easily and speedily upon selection of the compression-stroke injection mode. If the predetermined temperature is appropriately associated with the engine temperature observed when a warm-up operation is completed, the engine operation in the compression-stroke injection mode can be steadily performed even during the warm-up operation, so that the fuel-efficiency for the warm-up operation can be improved.

Preferably, the first correction factor is set in accordance with an engine characteristic proper to the internal combustion engine, so as to satisfy those requirements for the fuel evaporation rate and the fuel stratification degree which are associated with the stabilized combustion of the fuel injected into the combustion chamber.

According to this preferred arrangement, the fuel injection timing correction is carried out with use of the first correction factor, whereby the fuel injection timing suited to characteristics (engine temperature-fuel evaporation rate characteristic and engine temperature-fuel stratification degree characteristic, in particular) proper to the internal combustion engine can be set, so that the engine operation in the compression-stroke injection mode can be stabilized.

Preferably, the injection timing correction means includes correction restriction means for restricting the correction of the reference injection timing so as to cause the reference injection timing to fall within a range such that execution of the fuel injection in the compression-stroke injection mode is permitted.

According to this preferred arrangement, an excessive fuel injection timing correction such that the fuel injection timing for the compression-stroke injection mode is off the fuel injection timing range that ensures a stabilized combustion can be prevented, so that the engine operation in the compression-stroke injection mode can be steadily performed.

Preferably, the control apparatus of the present invention further comprises temperature detection means for detecting the engine temperature. The intake-stroke injection mode includes a first injection mode where the fuel is injected in the intake stroke in an amount to permit a mixture supplied to the combustion chamber to have an air-fuel ratio close to a stoichiometric air-fuel ratio, and a second injection mode where the fuel is injected in the intake stroke in an amount to attain the air-fuel ratio which is leaner than that achieved in the first injection mode. The compression-stroke injection mode includes a third injection mode where the fuel is injected in the compression stroke in an amount to attain the air-fuel ratio which is leaner than that achieved in the second injection mode. The injection mode selection means selects the first injection mode when the engine temperature detected by the temperature detection means is equal to or lower than a set temperature which is lower than the engine temperature observed when a warm-up operation of the internal combustion engine is completed, and selects the third injection mode when the engine temperature detected by the temperature detection means exceeds the set temperature.

According to the arrangement described above, fuel injection in the third injection mode is carried out when the engine temperature exceeds the set temperature lower than the engine temperature observed when the warm-up operation is completed, whereby a stabilized combustion can be ensured while the air-fuel ratio leaner than that achieved in the second injection mode can be attained. Also, the control response to engine load fluctuations can be improved by variably controlling the fuel injection quantity in accordance with the load conditions of the engine. Thus, high-response fuel injection control can be effected with higher fuel-efficiency without worsening the combustion performance, so that the drivability can be improved.

DETAILED DESCRIPTION

A control apparatus according to a first embodiment of the present invention and an in-cylinder injection internal combustion engine furnished with the control apparatus will now be described in detail with reference to the accompanying drawings.

Figure 1:
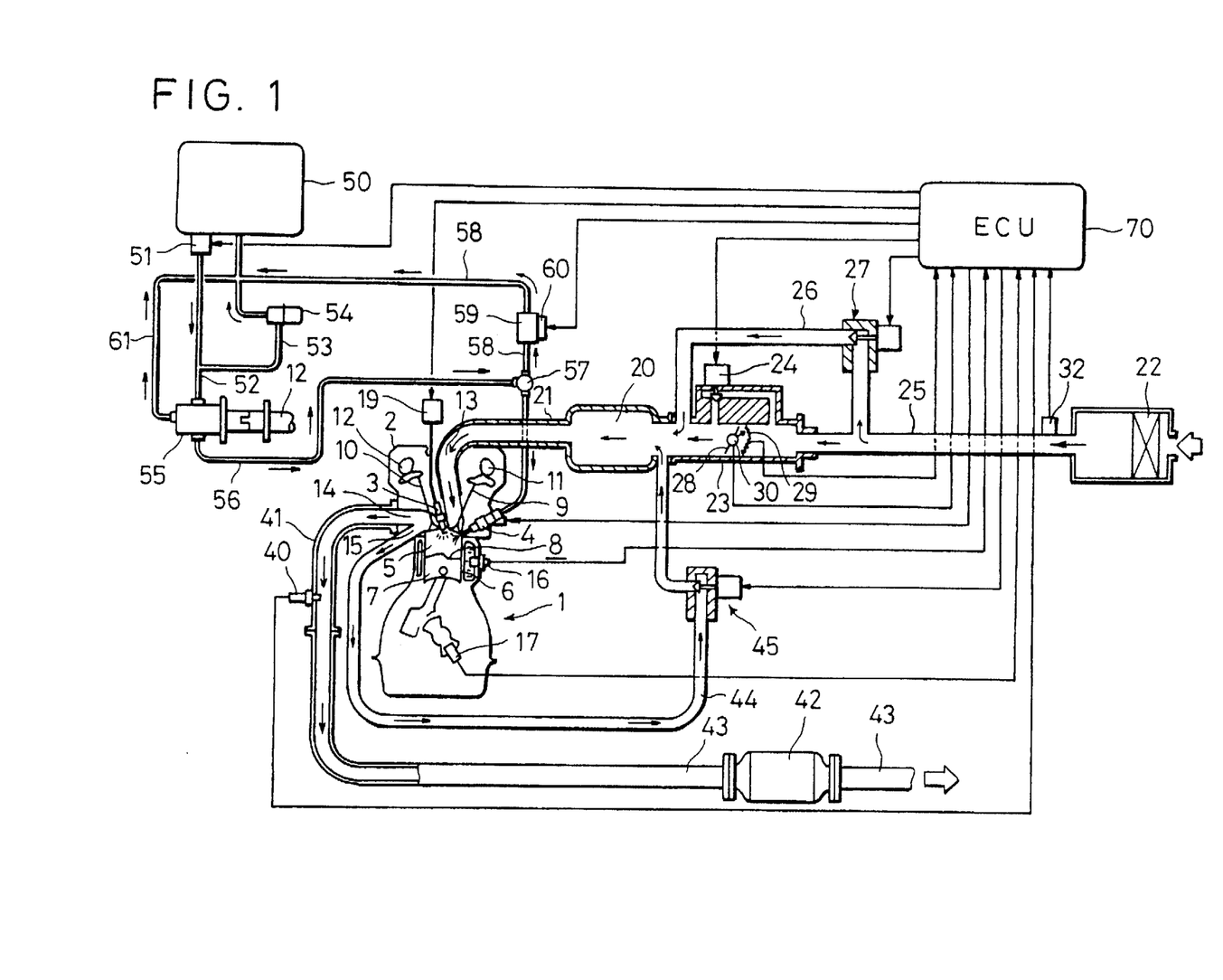
FIG. 1 is a schematic view showing an in-cylinder injection engine operated under the control of a control apparatus according to a first embodiment of the present invention.

In FIG. 1, reference numeral 1 denotes a straight-type in-cylinder injection four-cylindered gasoline engine (hereinafter referred to simply as engine) for automobile, whose combustion chamber, intake system, EGR system, etc. are designed exclusively for in-cylinder injection.

Figure 2:
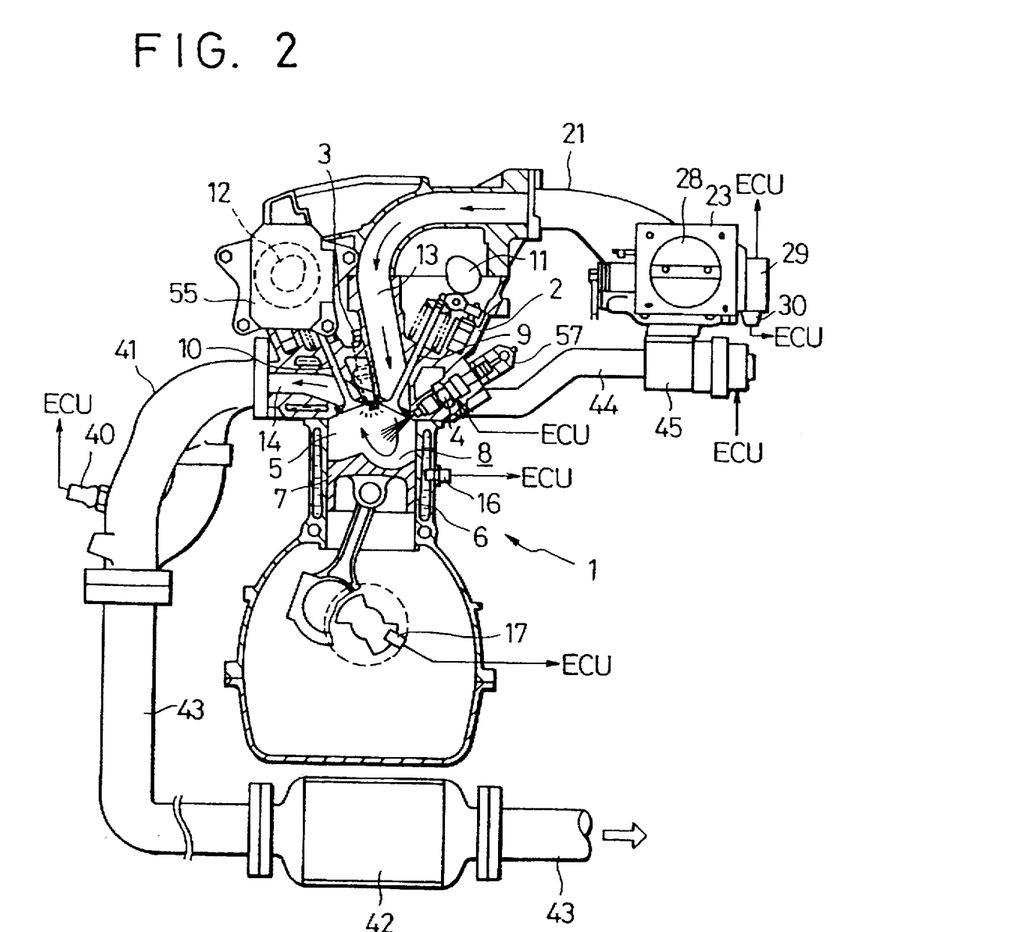
FIG. 2 is a vertical sectional view of a principal part of the engine shown in FIG. 1.

In the case of the present embodiment, a cylinder head 2 of the engine 1 is fitted with solenoid-operated fuel injection valves 4 and spark plugs 3 for respective cylinders, so that fuel is injected directly into the combustion chambers 5. A hemispherical cavity 8 is formed in the top face of a piston 7, which is disposed for vertical sliding motion in an associated cylinder 6, in a region that is reached by a fuel spray from the fuel injection valve 4 in the latter half of a compression stroke. The compression ratio of this engine 1 is set so as to be higher (about 12 according to the present embodiment) than that of a conventional manifold-injection type. A DOHC four-valve system is used as a valve operating mechanism. An intake-side camshaft 11 and an exhaust-side camshaft 12 are rotatably held in the upper portion of the cylinder head 2, in order to drive an intake valve 9 and an exhaust valve 10, respectively.

The cylinder head 2 is formed with intake ports 13, which extend substantially upright between the two camshafts 11 and 12, so that a stream of intake air having passed through each intake port 13 generates a reverse tumbling flow, which will be mentioned later, in the combustion chamber 5 concerned. Exhaust ports 14, like those of a conventional (manifold-injection type) engine, extend substantially in the horizontal direction, while a large-diameter EGR port 15 (not shown in FIG. 2) diverges diagonally downward from each exhaust port 14.

In FIG. 1, numeral 16 denotes a water temperature sensor for detecting an engine cooling water temperature Twt, 17 denotes a vane-type crank angle sensor that outputs a crank angle signal SGT in predetermined crank positions (e.g., 5° BTDC and 75° BTDC) for each cylinder, and 19 denotes an ignition coil that delivers high voltage to the spark plug 3 concerned. Each camshaft which rotates at half the speed of the crankshaft is fitted with a cylinder discriminating sensor (not shown) for outputting a cylinder discriminating signal SGC, whereby the cylinder for which the crank angle signal SGT is output is discriminated.

As shown in FIG. 2, the intake ports 13 are connected, through an intake manifold 21 having a surge tank 20, with an intake pipe 25 which is provided with an airflow sensor 32, an air cleaner 22, a throttle body 23, and a bypass line adapted to be opened and closed by means of a first air bypass valve (#1 ABV) 24 of a stepper-motor type. Further, the intake pipe 25 is connected in parallel with a large-diameter air bypass pipe 26 through which intake air is introduced into the intake manifold 21, bypassing the throttle body 23. The pipe 26 is provided with a large-sized second air bypass valve (#2 ABV) 27 of a linear-solenoid type. The air bypass pipe 26 has a flow area thereof substantially equal to that of the intake pipe 25, so as to permit a required amount of intake air for a low or medium speed region of the engine 1 to flow appropriately therethrough when the #2 ABV 27 is fully open.

The throttle body 23 is provided with a butterfly-type throttle valve 28 for opening and closing the passage of the throttle body, a throttle sensor 29 for detecting an opening θTH of the valve 28, and an idle switch 30 for detecting a fully-closed state of the valve 28. In actual, a throttle voltage VTH corresponding to the throttle opening θTH is delivered from the throttle sensor 29, and the opening θTH is recognized by the voltage VTH. The airflow sensor 32 for detecting an intake air amount Qa is formed of a Karman-vortex airflow sensor, for example. The intake air amount Qa may alternatively be obtained from the pressure in the intake pipe detected by means of a boost pressure sensor which is attached to the surge tank 20.

The exhaust ports 14 are connected with an exhaust pipe 43 which is provided with a three-way catalyst 42, muffler (not shown), etc., through an exhaust manifold 41 which is fitted with an $O_2$ sensor 40. Also, each EGR port 15 is connected to the upstream side of the intake manifold 21 through a large-diameter EGR pipe 44 whose line is provided with an EGR valve 45 of a stepper-motor type.

The fuel stored in a fuel tank 50, which is disposed at the rear portion of a vehicle body (not shown), is sucked up by means of a motor-operated low-pressure fuel pump 51, and is supplied toward the engine 1 through a low-pressure feed pipe 52. The pressure (fuel pressure) of the supplied fuel in the feed pipe 52 is adjusted to a relatively low pressure (low fuel pressure) by means of a first fuel pressure regulator 54, which is inserted in the line of a return pipe 53. The fuel supplied toward the engine 1 is fed into each fuel injection valve 4 through a high-pressure feed pipe 56 and a delivery pipe 57 by means of a high-pressure fuel pump 55, which is attached to the cylinder head 2.

The fuel pressure in the delivery pipe 57 is adjusted to a relatively high pressure (high fuel pressure) by means of a second fuel pressure regulator 59 which is inserted in the line of a return pipe 58. A motor-operated fuel pressure selector valve 60 attached to the second fuel pressure regulator 59 serves to relieve the fuel to lower the fuel pressure in the delivery pipe 57 to the level of the low fuel pressure when it is on. The fuel is returned to the fuel tank 50 through a return pipe 61 after it is used to lubricate or cool the high-pressure fuel pump 55.

An electronic control unit (ECU) 70, which serves for general control of the engine 1, is furnished with an input-output unit, storage unit (ROM, RAM, etc.) used to store control programs, control maps, etc., central processing unit (CPU), timer counter, etc., which are not shown. The ECU 70 receives detection information from the aforesaid various sensors, determines an ignition timing, EGR gas introduction amount, etc., as well as a fuel injection mode and fuel injection quantity, and drivingly controls the fuel injection valves 4, ignition coils 19, EGR valves 45, etc. Also, the ECU 70 is connected with various warning lamps and devices, as well as a large number of switches and other sensors (not shown).

The following is a brief description of the basic flow of engine control for the in-cylinder injection internal combustion engine constructed in the aforementioned manner.

If the ignition key is turned on when the engine is cold, the ECU 70 switches on the low-pressure fuel pump 51 and the fuel pressure selector valve 60, whereupon the fuel injection valves 4 are supplied with the fuel at low fuel pressure. When the ignition key is then turned to start operation in this state, the engine 1 is cranked by a self-starting motor (not shown), and at the same time, fuel injection control is initiated under the control of the ECU 70. At this point of time, both the evaporation rate of the fuel and the fuel pressure are low, so that the ECU 70 injects the fuel in a manner such that the air-fuel ratio is relatively rich. Since the second air bypass valve 27 is closed under the control of the ECU 70, the intake air is fed into the combustion chamber 5 through a gap around the throttle valve 28 or the bypass line associated with the first air bypass valve 24. The first and second air bypass valves 24 and 27 are controlled unitarily by the ECU 70, and their respective openings are settled depending on a required introduction amount of the intake air (bypass air) that bypasses the throttle valve 28.

When the engine 1 starts idle operation after the starting is completed, the high-pressure fuel pump 55 initiates a rated discharge operation. In response to this, the ECU 70 turns off the fuel pressure selector valve 60, and supplies the fuel at high fuel pressure to the fuel injection valves 4. Until the engine cooling water temperature Twt is raised to a predetermined value, the ECU 70 injects the fuel to secure a rich air-fuel ratio, and the second air bypass valve 27 continues to be closed, just as at the time of the engine starting. The idle speed control that is based on the variation of the loads of auxiliary-function apparatuses, such as an air conditioner, is carried out by means of the first air bypass valve 24, as in the case of the manifold-injection type engine. When the activation of the $O_2$ sensor 40 is completed, the ECU 70 starts air-fuel ratio feedback control in accordance with the output voltage of the $O_2$ sensor 40, and the three-way catalyst 42 is permitted to remove harmful exhaust gas components. As described in the above, when the engine is cold, fuel injection control is effected substantially in the same manner as in the case of the manifold-injection engine.

Figure 3:
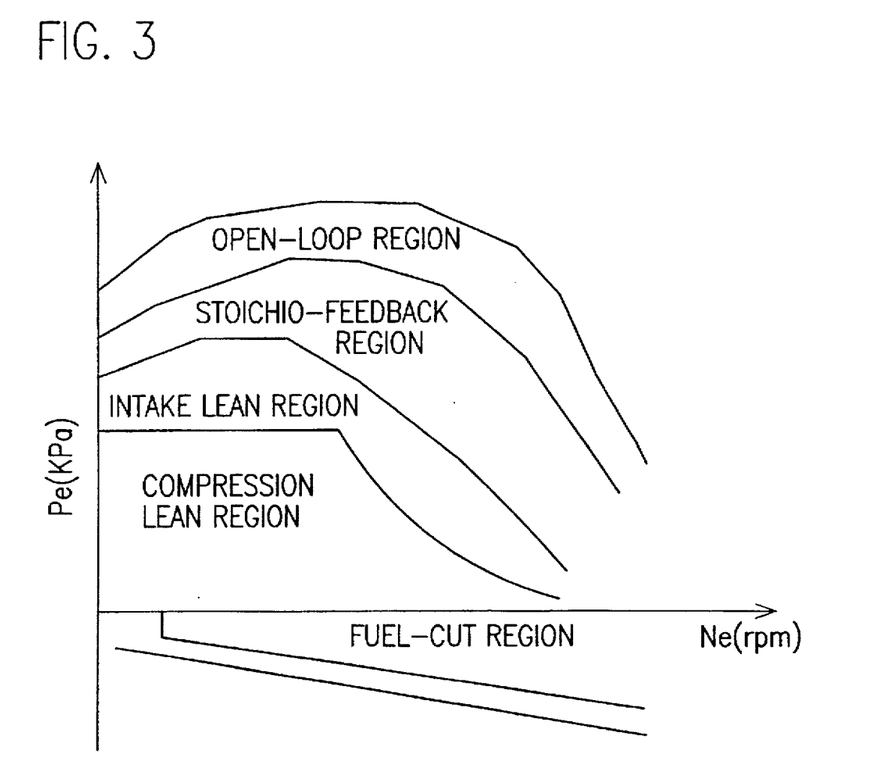
FIG. 3 is a diagram illustrating various fuel injection control regions indicated as a function of engine speed and average effective pressure.

When warming up the engine 1 is finished, the ECU 70 retrieves a present fuel injection control region from a fuel injection control map shown in FIG. 3, for example, in accordance with the engine speed Ne and a target average effective pressure Pe which is obtained from the intake air amount Qa or throttle opening θTH, etc. Then, the ECU 70 determines the fuel injection mode, fuel injection quantity, and fuel injection timing, and drives the fuel injection valves 4. Thus, the ECU 70 functions as injection mode selection means, injection timing setting means, and fuel injection control means. Further, the ECU 70 controls the open-close operation of the first and second air bypass valves 24 and 27 and the EGR valves 45. Naturally, the fuel injection quantity is proportional to the valve-open time duration of the fuel injection valve 4.

In a low-load region for idle operation or low-speed drive, the engine is operated in a compression lean region (third injection mode region), as shown in the map of FIG. 3, so that the ECU 70 selects a compression-stroke injection mode (third injection mode). Then, the second air bypass valve 27 is opened, and the fuel is injected so as to obtain a lean average air-fuel ratio (e.g., about 30 to 40). Thereupon, the intake air flow introduced through the intake port 13 generates a reverse tumbling flow, so that a fuel spray is kept in the cavity 8 of the piston 7. As a result, an air-fuel mixture of an air-fuel ratio near the stoichiometric air-fuel ratio is formed in a layer around the spark plug 3 at the time of ignition, so that the fuel can catch fire even with a lean overall air-fuel ratio. In this state, the control of the idle speed responsive to variations in the engine load caused by operations of the auxiliary-function apparatuses is carried out by increasing or decreasing the fuel injection quantity, for example. In this control region, moreover, the ECU 70 opens the EGR valve 45 to introduce a large amount (e.g., 30% or more) of EGR gas into the combustion chamber 5, thereby greatly reducing the emission of NOx.

In a medium-load region for constant-speed drive or the like, the engine is operated in an intake lean region (second injection mode region) or a stoichio-feedback region (first injection mode region) shown in FIG. 3, depending on the engine load state and the engine speed Ne, so that the ECU 70 selects an intake-stroke injection mode (second injection mode), and injects the fuel so as to obtain a predetermined air-fuel ratio. More specifically, the respective openings of the first and second air bypass valves 24 and 27 and the fuel injection quantity are controlled so as to obtain a relatively lean air-fuel ratio (e.g., about 20 to 23) in the intake lean region for the intake-stroke injection mode. In the stoichio-feedback region, the air-fuel ratio feedback control is carried out in accordance with the output voltage of the $O_2$ sensor 40, with the second air bypass valve 27 kept closed and with the EGR valve 45 controlled by the ECU 70.

In the intake lean region, the fuel can be ignited even with a lean air-fuel ratio, due to the effect of a turbulence attributable to the reverse tumbling flow that is formed by the intake air flow introduced through the intake port 13. In the stoichio-feedback region, harmful exhaust gas components are removed by means of the three-way catalyst 42. By controlling each EGR valve 45 so as to introduce a suitable amount of EGR gas into the associated combustion chamber 5, the emission of NOx or the like, generated as the harmful exhaust gas, can be reduced.

In a high-load region for sudden acceleration or high-speed drive, an open-loop control region shown in FIG. 3 is reached, so that the ECU 70 selects a first-term injection mode, closes the second air bypass valve 27, and injects the fuel so as to obtain a relatively rich air-fuel ratio in accordance with the throttle opening θTH, engine speed Ne, etc. Since a fuel-cut region shown in FIG. 3 is reached when the vehicle is coasting in a medium- or high-speed drive mode, the ECU 70 stops the fuel injection. Fuel-cut operation is terminated immediately when the engine speed Ne falls below a restoration speed for restarting the fuel supply or when the accelerator pedal is depressed.

In short, the engine 1 is operated with a rich air-fuel ratio at the time of cold starting and during the idle operation subsequent thereto, with the stoichiometric air-fuel ratio after the completion of the activation of the $O_2$ sensor, and in the injection mode corresponding to any one of the various fuel injection control regions shown in FIG. 3 after the completion of the warm-up operation.

As is evident from the above description, an injection mode for achieving a rich air-fuel ratio is selected during the warm-up operation of the engine, that is, during the time interval from the moment when the engine is started to the moment when the engine cooling water temperature Twt which is detected by the water temperature sensor (temperature detection means) 16 and which indicates the engine temperature is raised to a first predetermined temperature (set temperature) $\alpha$. In other words, before the first predetermined temperature $\alpha$ is attained by the cooling water temperature Twt, fuel injection in an intake lean mode for achieving a relatively lean air-fuel ratio and in a compression lean mode for achieving a leaner air-fuel ratio is prohibited.

When the cooling water temperature Twt reaches the first predetermined temperature $\alpha$, the fuel injection in the compression lean mode is first permitted. During the engine operation in the compression lean mode, the engine output torque increases in proportion to the fuel injection quantity. Accordingly, a satisfactory response can be obtained by controlling the fuel injection quantity in dependence on the variable engine load, so that a stabilized combustion can be ensured even in the case where the engine temperature and the cylinder temperature are low.

If the cooling water temperature Twt is further raised to reach a second predetermined temperature (e.g., cooling water temperature attained when the warm-up operation is completed) $\beta$ which is higher than the first predetermined temperature $\alpha$, the fuel injection in the compression lean mode and in the intake lean mode is permitted, so that the compression or intake lean mode can be selected.

Figure 4:
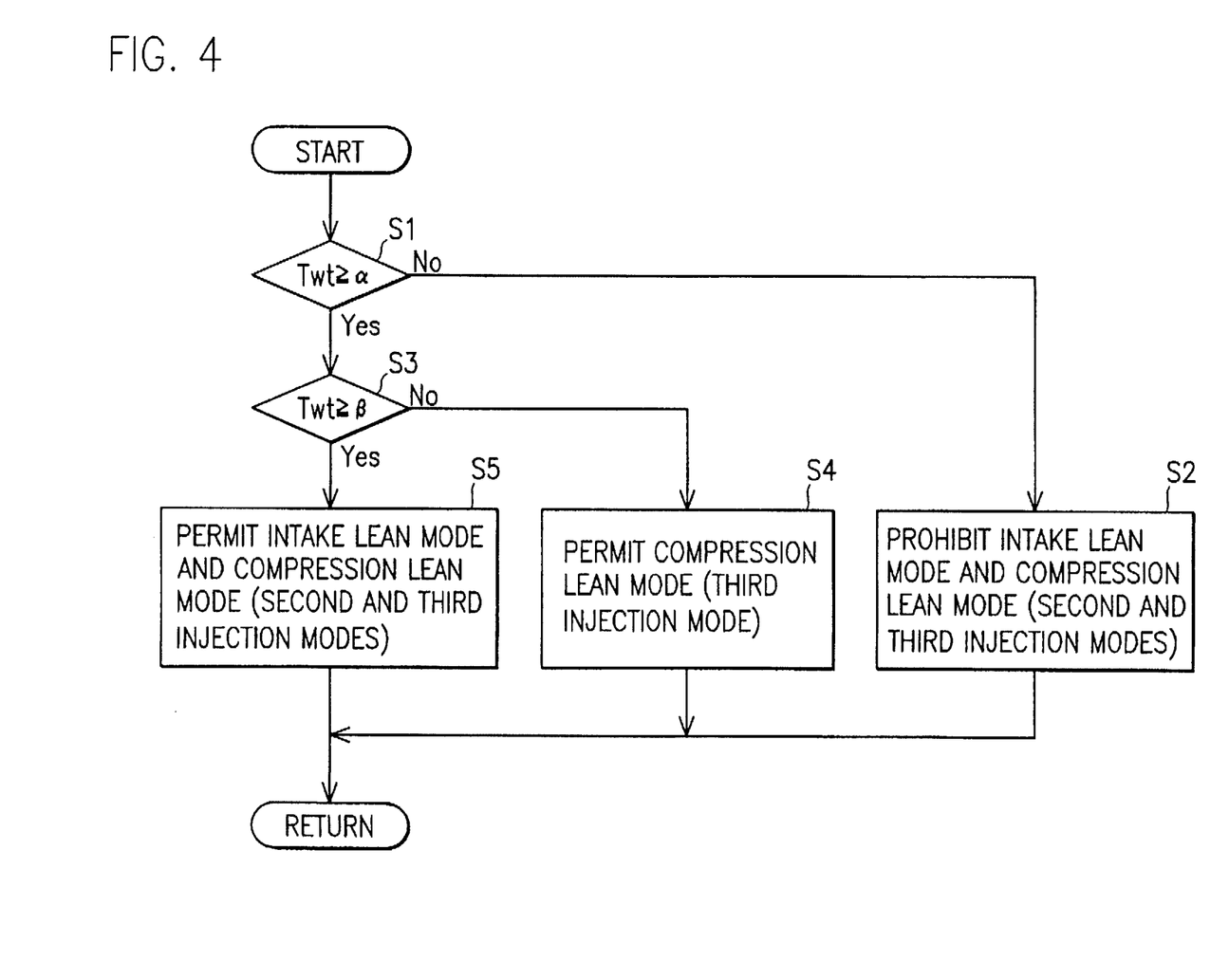
FIG. 4 is a flowchart for fuel injection control carried out by means of the control apparatus according to the first embodiment of the invention during warm-up operation of the engine.

Referring now to FIG. 4, the fuel injection control during the warm-up operation carried out by the ECU 70 will be described further.

When the engine 1 is started, it is determined whether or not the engine cooling water temperature Twt is equal to or higher than the first predetermined temperature $\alpha$ (Step S1). If the conclusion in this step is No, that is, if it is concluded that the cooling water temperature Twt is lower than the first predetermined temperature $\alpha$, both the intake and compression lean modes are prohibited, and the fuel injection in the intake stroke is executed so that the air-fuel ratio of the air-fuel mixture in the combustion chamber is a relatively rich one (Step S2). Thus, when the engine temperature is as low as at the time of cold starting, the engine 1 is operated without the possibility of the occurrence of a misfire or emission of unburned fuel.

If it is concluded that the cooling water temperature Twt is equal to or higher than the first predetermined temperature $\alpha$, a determination is made as to whether or not the temperature Twt is equal to or higher than the second predetermined temperature $\beta$ (Step S3). If the conclusion in this step is No, that is, if it is concluded that the cooling water temperature Twt is equal to or higher than the first predetermined temperature $\alpha$ and is lower than the second predetermined temperature $\beta$, only the compression lean mode is permitted (Step S4).

Even during the warm-up operation, therefore, the fuel injection is carried out in the compression stroke so as to obtain a very lean air-fuel ratio as long as the cooling water temperature Twt is equal to or higher than the first predetermined temperature $\alpha$.

If it is concluded in Step S3 that the cooling water temperature Twt is equal to or higher than the second predetermined temperature $\beta$, it is concluded that the warm-up operation is completed, whereupon both the compression and intake lean modes are permitted (Step S5), according to the present embodiment using the second predetermined temperature $\beta$ which is set to a value equal to the cooling water temperature attained when the warm-up operation is completed.

Thus, when the warm-up operation is finished, the fuel injection is carried out in various injection modes, depending on the operating state of the engine.

According to the present embodiment, as described above, if the engine cooling water temperature Twt detected by the water temperature sensor (temperature detection means) 16 is equal to or higher than the first predetermined temperature $\alpha$, then the compression lean mode can be selected out of the intake and compression lean modes that permit the engine 1 to be operated with a lean air-fuel ratio. The compression lean mode ensures stabilized combustion and satisfactory response even at low engine temperatures. If the cooling water temperature Twt detected by the sensor 16 is equal to or higher than the second predetermined temperature $\beta$, both the intake and compression lean modes can be selected. In this situation, the ECU 70 functions as injection mode selection means.

Thus, even when the second predetermined temperature $\beta$ at which the warm-up operation is completed is not attained by the cooling water temperature, that is, even during the warm-up operation, the drivability and the fuel-efficiency can be improved by preferentially permitting the fuel injection in the compression lean mode that ensures stabilized combustion at a relatively low temperature and good response.

The following is a description of a control apparatus according to a second embodiment of the present invention.

The second embodiment is intended mainly to effect a fuel injection control that is reflective of influences of the engine temperature on the fuel evaporation rate and fuel stratification degree. This embodiment is characterized mainly in that a fuel injection in the compression lean mode during the warm-up operation is carried out more appropriately, as compared to that of the first embodiment. For other points, the present embodiment resembles the first embodiment. The control apparatus according to the second embodiment has basically the same constructions and functions as the one according to the first embodiment, and is applicable to the engine 1 shown in FIGS. 1 and 2. Accordingly, a description of the constructions and functions common to the two embodiments is omitted.

Figure 5:
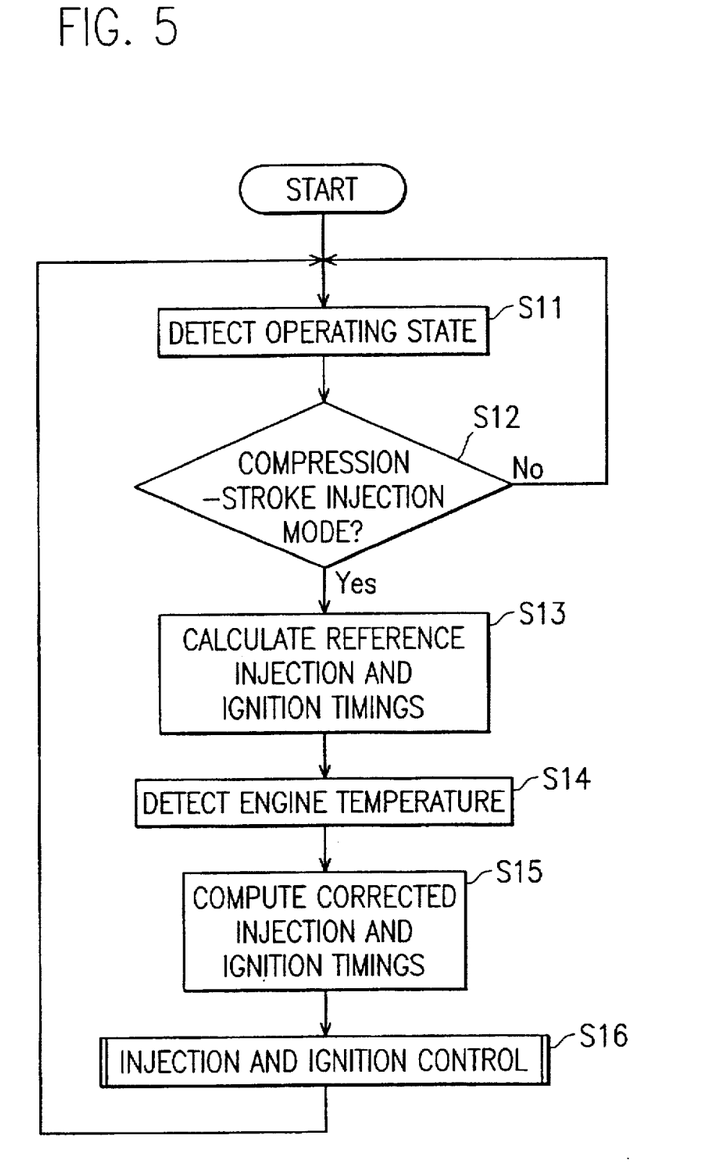
FIG. 5 is a flowchart for a fuel injection timing and ignition timing control routine for a compression-stroke injection mode carried out by means of a control apparatus according to a second embodiment of the invention.

FIG. 5 illustrates, by way of example, a control routine for the fuel injection timing and ignition timing, which is executed by the control apparatus of the present embodiment in accordance with the engine cooling water temperature Twt that is indicative of the engine temperature.

In the control routine of FIG. 5, the operating state of the engine is first detected (Step S11). More specifically, in this operating state detection, the engine speed Ne is detected and a specific cylinder is discriminated in accordance with the crank angle signal SGT and the cylinder discriminating signal SGC corresponding to each cylinder. Also, the throttle opening θTH, the fully-closed state of the throttle valve 28, and the intake air amount Qa are detected. The load state of the internal combustion engine is discriminated in accordance with the result of detection of the engine operating state, and an appropriate one of the aforesaid fuel injection modes is selectively established by the ECU (injection mode selecting means) 70.

Thereafter, it is determined whether or not the established fuel injection mode is the compression-stroke injection mode (Step S12). If the conclusion in this step is No, that is, if it is concluded that any other mode than the compression-stroke injection mode, i.e., the intake-stroke injection mode or the air-fuel ratio feedback control mode for the stoichio-feedback region, is established, the program returns to Step S11. Actually, a fuel injection control corresponding to the injection mode that is determined in Step S12 is executed. A description of the fuel injection control is omitted since it does not directly relate to the gist of the present invention.

If the conclusion in Step S12 is Yes, that is, if it is concluded that the compression-stroke injection mode is established, a reference fuel injection timing and a reference ignition timing for the compression-stroke injection mode are computed (Step S13). This computation is carried out on the assumption that the engine is in a steady-state operation that follows the warm-up operation. According to this computation, a reference fuel injection timing and a reference ignition timing such that an air-fuel mixture having an air-fuel ratio (ratio of air to fuel by weight) close to the stoichiometric air-fuel ratio can be formed locally around the spark plug or in the cavity are calculated and set in accordance with the quantity of fuel injected into the cylinder concerned and the like.

More specifically, a valve-opening time of the fuel injection valve needed to inject a required quantity of fuel into the cylinder is obtained based on the fuel pressure and the required fuel injection quantity, and the fuel injection termination timing is determined so that the fuel injection terminates during the compression stroke. Thereafter, the fuel injection start timing is determined in accordance with the settled fuel injection termination timing and valve-opening time, and the ignition timing is settled in accordance with the injection termination timing. In this case, the ECU 70 functions as fuel injection timing and ignition timing setting means.

The fuel injection start and termination timings and the ignition timing for the compression-stroke injection mode are determined in consideration of the time required for the evaporation of the fuel in the cylinder and that for the diffusion of the fuel spray, in particular. Thus, the fuel injection start and termination timings and the ignition timing can be settled so that the fuel in the cavity can securely evaporate and collect around the spark plug, without causing the fuel spray to diffuse widely, whereby an air-fuel mixture having an air-fuel ratio close to the stoichiometric air-fuel ratio can be formed in a layer around the spark plug.

The actual engine temperature is detected (Step S14) after a reference fuel injection timing Tinj (fuel injection start or termination timing) and a reference ignition timing Tig for the compression-stroke injection mode are set in the above manner on the assumption that the engine is in a steady-state operation. More specifically, the engine cooling water temperature Twt indicative of the engine temperature is detected.

Then, on the basis of the detected engine temperature (engine cooling water temperature Twt), a corrective computation for the reference fuel injection timing Tinj and the reference ignition timing Tig is carried out to rationalize the state of air-fuel mixture formation around the spark plug at the ignition timing, which varies depending on the fuel evaporation rate and the degree of fuel spray diffusion which in turn vary in dependence on the engine temperature (Step S15).

In the corrective computation in Step S15, a corrected fuel injection timing Tinj and a corrected ignition timing Tig are calculated according to the following equations, in order to give appropriate consideration to influences of the engine cooling water temperature, engine speed, and engine load on the fuel injection timing and ignition timing, thereby rationalizing the state of mixture formation:

$$Tinj = Tinj + K_B \cdot K1 \cdot K2,$$

$$Tig = Tig + K_B \cdot K1 \cdot K2,$$

where $K_B$ is a correction amount for the fuel injection timing Tinj and the ignition timing Tig, and K1 and K2 are correction factors.

In the embodiment described above, the same correction amount $K_B$ is used for the correction processes for the fuel injection timing Tinj and the ignition timing Tig. It is to be understood, however, that different correction amounts for the fuel injection and ignition timings may be set in association with each other.

Figure 6:
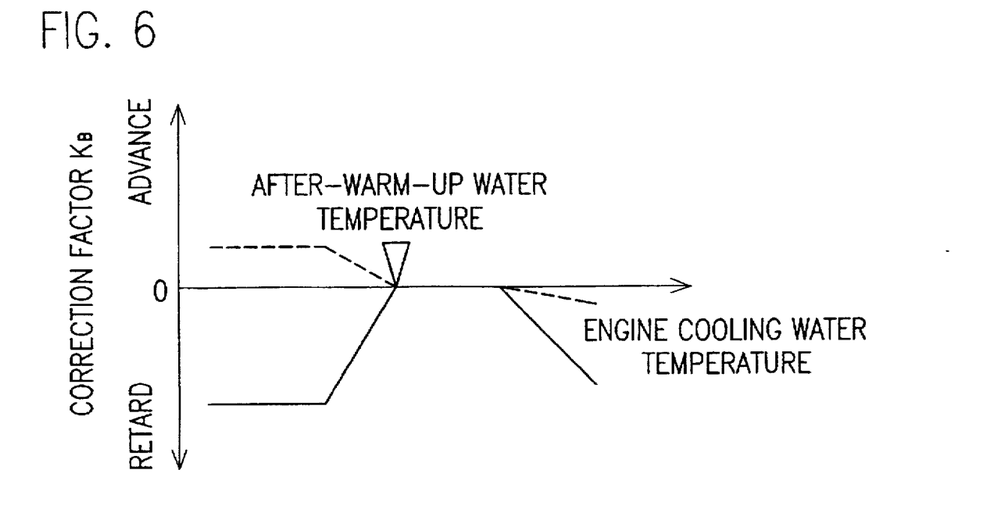
FIG. 6 is a graph illustrating, by way of example, an engine water temperature-basic correction amount $K_B$ characteristic curve used in the fuel injection timing and ignition timing control shown in FIG. 5.
Figure 7:
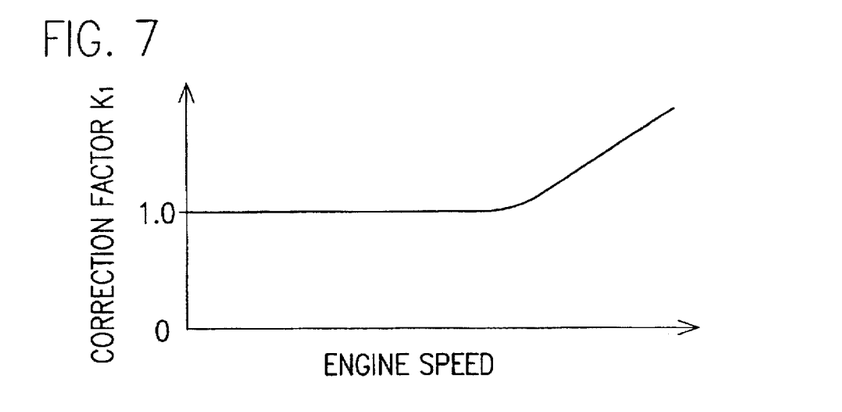
FIG. 7 is a graph illustrating, by way of example, an engine speed-correction factor K1 characteristic curve used in the control of FIG. 5.
Figure 8:
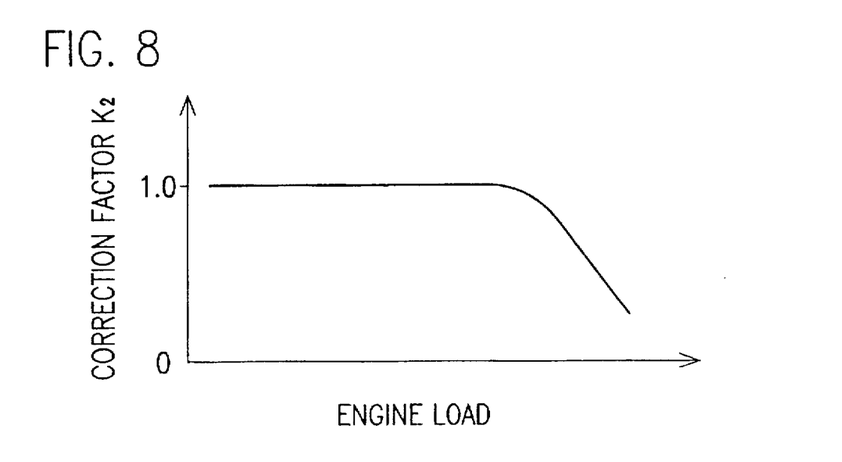
FIG. 8 is a graph illustrating, by way of example, an engine load-correction factor K2 characteristic curve used in the control of FIG. 5.

In the present embodiment, the correction amount $K_B$ and the correction factors K1 and K2 are obtained according to an engine cooling water temperature Twt-correction amount $K_B$ characteristic curve, engine speed Ne-correction factor K1 characteristic curve, and engine load-correction factor K2 characteristic curve which are shown, by way of example, in FIGS. 6, 7 and 8, respectively.

As mentioned in detail later, the extents of influences of the engine cooling water temperature, engine speed, and engine load on the fuel injection timing and the ignition timing vary depending on the type (more specifically, arrangements of the intake and fuel injection systems, such as the sizes and shapes of the intake port and cavity, specifications of the fuel injection valve, etc., in particular) of the engine to which the present invention is applied and proper characteristics of the engine that are determined by the engine type.

The three characteristic curves shown in FIGS. 6, 7 and 8 are, for example, experimentally set in advance for each engine type, to which the invention is applied, in order to reflect the proper characteristics of the engine appropriately on the fuel injection timing and ignition timing control.

The correction amounts (first correction factors) $K_B$ indicated by the solid and broken lines in FIG. 6 are suited to engines of two specific types, and are used in the aforesaid corrective computation in order to attain an optimum fuel injection timing and an optimum ignition timing that satisfy requirements for the fuel evaporation rate and fuel stratification degree. The correction amount indicated by the solid line in FIG. 6 is associated with engines of a type having the fuel injection timing-fuel evaporation rate characteristics shown in FIG. 9 and the fuel injection timing-fuel stratification degree characteristics shown in FIG. 10. The correction amount indicated by the broken line in FIG. 6 is associated with engines of another type having the characteristics shown in FIGS. 11 and 12.

Figure 9:
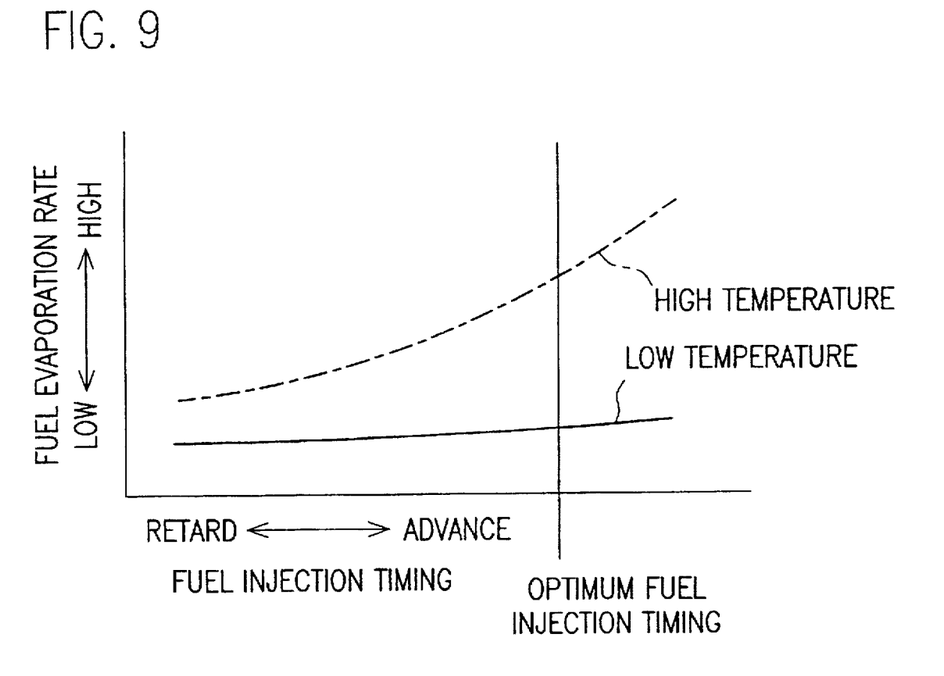
FIG. 9 is a graph showing fuel injection timing-fuel evaporation rate characteristics of an engine to which the control apparatus according to the second embodiment is applied.
Figure 10:
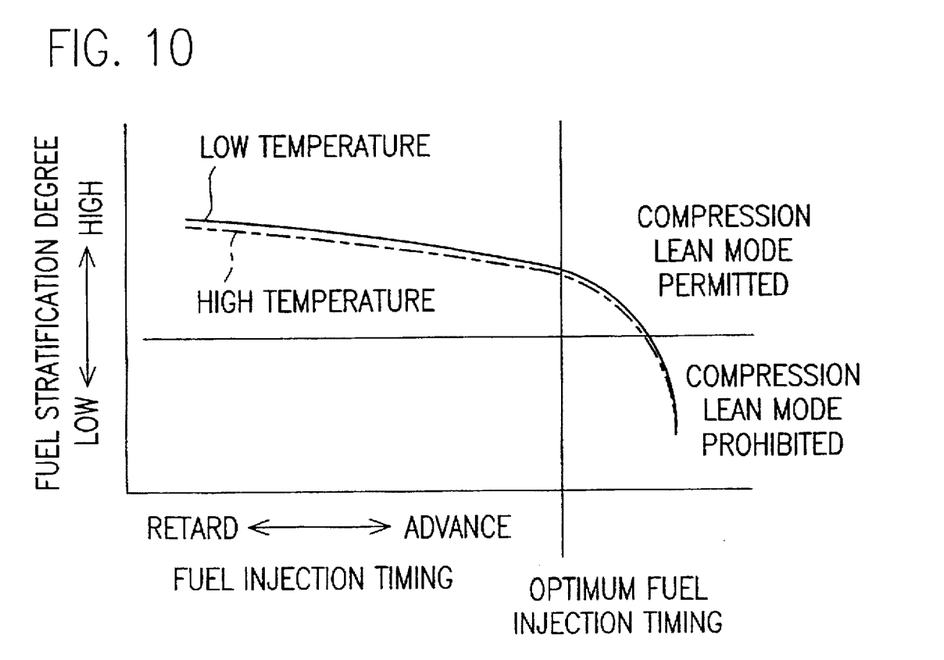
FIG. 10 is a graph showing fuel injection timing-fuel stratification degree characteristics of the engine associated with FIG. 9.
Figure 11:
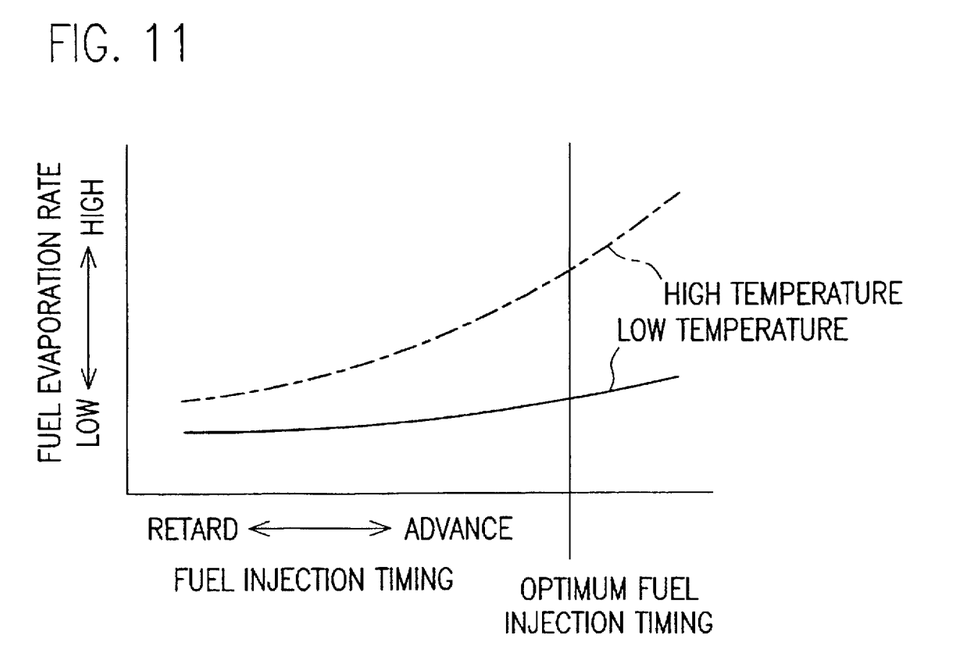
FIG. 11 is a graph showing fuel injection timing-fuel evaporation rate characteristics of another engine to which the control apparatus according to the second embodiment is applied.
Figure 12:
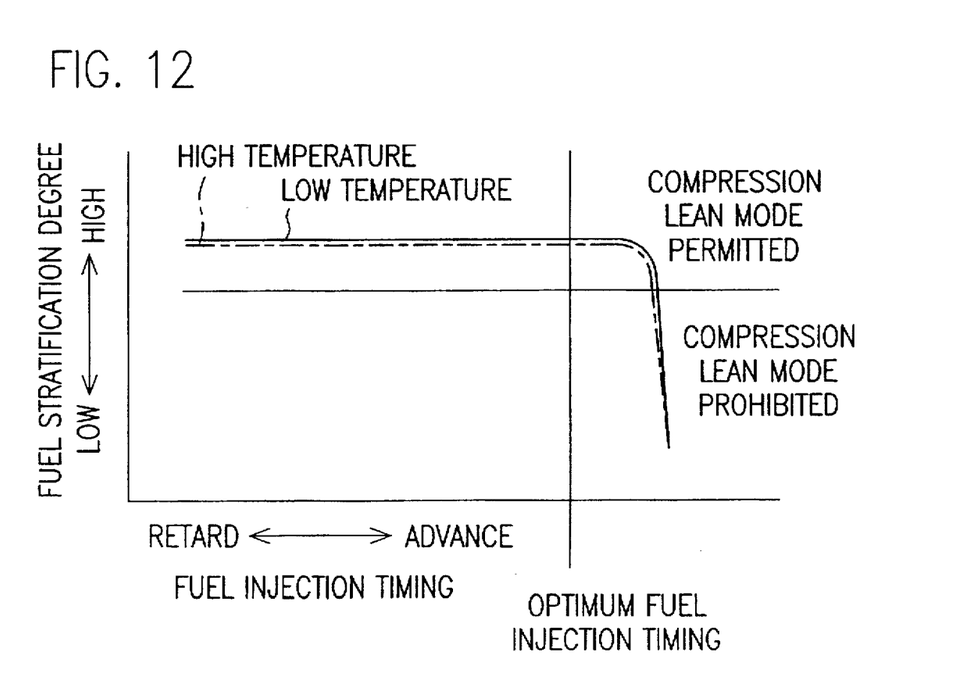
FIG. 12 is a graph showing fuel injection timing-fuel stratification degree characteristics of the engine associated with FIG. 11.

FIGS. 9 and 11 show fuel evaporation rates as a function of fuel injection timing, that is, the degrees to which the fuel injected into the cylinder at a certain injection timing is evaporated before it is ignited by the spark plug. FIGS. 10 and 12 show fuel stratification degrees as a function of fuel injection timing, that is, whether the fuel injected into the cylinder at a certain injection timing is collected in a limited part (around the spark plug) of the combustion chamber (stratification degree is high), or whether it is diffused uniformly throughout the combustion chamber (stratification degree is low).

As described above, the fuel injection timing-fuel evaporation rate characteristics and the fuel injection timing-fuel stratification degree characteristics vary in some measure according to the engine type.

In the case where the engine temperature of an engine having the characteristics shown in FIGS. 9 and 10 is high, the fuel evaporation rate is improved by setting the fuel injection timing on the advance side. More specifically, if the engine temperature is high, the temperature of air sucked into the combustion chamber is raised, so that the fuel easily evaporates. If the fuel injection timing is advanced to lengthen the fuel evaporation time, the fuel evaporation rate is improved still more.

In the case where the engine temperature is low, on the other hand, the temperature of air sucked into the combustion chamber is so low that the fuel cannot easily evaporate, and hence the fuel evaporation rate is lower than in the case where the engine temperature is high. The fuel evaporation rate hardly changes irrespective of the fuel injection timing. In other words, the fuel evaporation rate is not worsened much even if the fuel injection timing is retarded. The evaporation of the fuel at a low engine temperature is believed to be accelerated not by an increased intake air temperature at the time of suction but by a subsequent air temperature increase in the cylinder that is caused when the sucked air is compressed in the cylinder as the piston rises. When the engine temperature is low, therefore, the fuel injection timing has no substantial influence on the fuel evaporation rate.

As shown in FIG. 10, the fuel stratification degree has a tendency to increase as the extent of retard of the fuel injection timing increases, without being substantially influenced by the engine temperature. In the compression-stroke injection mode, combustion conditions cannot be fulfilled when the stratification degree is lower than a predetermined degree. The fuel injection timing-stratification degree characteristics change with manufacturing errors or secular changes of the engine. Practically, therefore, the fuel injection timing must be set on the retard side with some allowance, in order to obtain a stratification degree not lower than the predetermined degree for the stabilized combustion in the compression-stroke injection mode.

For the engine having the characteristics shown in FIGS. 9 and 10, in consideration of these circumstances, the optimum fuel injection timing (reference fuel injection timing) used at the time of completion of the warm-up operation at which the engine temperature is relatively high should preferably be set within a fuel injection timing range such that a certain fuel evaporation rate can be secured and a reduction in the stratification degree is not substantial. At the time of low engine temperature (e.g., during the warm-up operation), if the fuel is injected at the same timing as the aforesaid optimum fuel injection timing for the high-temperature state, the combustion may possibly fail to be stabilized since the fuel evaporation rate is much lower than that obtained when the warm-up operation is completed. As mentioned before, the fuel evaporation rate at a low temperature is hardly worsened even if the fuel injection timing is retarded. In this respect, the fuel injection timing is retarded to improve the stratification degree, as indicated by the solid line in FIG. 6, whereby the combustion can be stabilized.

However, the optimum fuel injection timing varies depending on the details of the engine construction even in the same engine type, so that it may possibly have to be set on the advance or retard side of the timings shown in FIGS. 9 and 10.

The following is a description of an engine having the characteristics shown in FIGS. 11 and 12. As in the case of the aforesaid engine having the characteristics shown in FIGS. 9 and 10, the fuel evaporation rate in this engine at the time of high engine temperature is improved as the fuel injection timing is advanced. When the engine temperature is low, the fuel evaporation rate is slightly improved as the injection timing is advanced, unlike the aforesaid engine. That is, the engine shown in FIGS. 11 and 12 is a little higher than the engine shown in FIGS. 9 and 10 in the effect of improvement of the evaporation rate produced by the increase in the temperature of suction air caused when the sucked air is subsequently compressed in the combustion chamber. More specifically, as compared to the engine of FIGS. 9 and 10, in the engine of FIGS. 11 and 12 where a flow movement of fuel or the like in the cylinder is relatively weak, the fuel is supposed to be evaporated even at a low engine temperature by a considerably adiabatic air in the cylinder. In the engine of this type, the fuel evaporation rate can be enhanced by advancing the fuel injection timing so that the fuel evaporation time is lengthened.

As shown in FIG. 12, the stratification degree of this engine is substantially kept equal irrespective of the engine temperature, and hardly changes even if the fuel injection timing is retarded in some measure. This tendency is particularly noticeable in engines in which a flow of the fuel in the cylinder is relatively small. In the case of the engine having the characteristics shown in FIGS. 11 and 12, just as in the case of the foregoing engine, the optimum fuel injection timing for the time of completion of the warm-up operation should preferably be set within a range such that a certain fuel evaporation rate can be secured and no substantial reduction occurs in the stratification degree. When the engine temperature is low, on the other hand, in view of the fact that the stratification degree is hardly worsened even if the fuel injection timing is advanced, the fuel injection timing is advanced to improve the stratification degree and stabilize the combustion, as indicated by broken line in FIG. 6.

The aforesaid correction of the fuel injection timing is based on these points of view, and is executed in accordance with correction functions obtained in advance according to the engine type and shown in FIGS. 6, 7 and 8.

The following is a brief description of the correction amount $K_B$, one of the correction functions, for the engine cooling water temperature Twt.

As described above, the fuel evaporation rate and the fuel stratification degree, which are concerned in the stability of the engine operation, vary depending on the engine temperature and the engine type. Accordingly, the correction amount $K_B$ used for the computation of the optimum fuel injection timing Tinj is set in accordance with the engine cooling water temperature Twt that is indicative of the engine temperature. Also, the amount $K_B$ is set for each engine type on basis of characteristics proper to the engine concerned therewith.

In the case of the engine having the characteristics shown in FIGS. 9 and 10, for example, if the engine cooling water temperature Twt is lower than an after-warm-up water temperature at or above which a stable engine operation is permitted, the combustion stability can be enhanced by retarding the fuel injection timing Tinj, as is evident from the above description. In this case, the correction amount $K_B$ is obtained according to the engine cooling water temperature Twt-correction amount $K_B$ characteristic curve (indicated by the solid line in FIG. 6) which is proper to the engine having the characteristics shown in FIGS. 9 and 10, and the thus obtained correction amount $K_B$ is used for the fuel injection timing correction.

The maximum value of the correction amount $K_B$ is restricted (or clip-controlled) so as to satisfy requirements for the fuel injection timing that permits fuel injection in the compression-stroke injection mode. In this case, the ECU 70 functions as correction restriction means.

The correction factors K1 and K2 serve to correct the correction amount $K_B$ in accordance with the engine speed Ne and the engine load. These correction factors K1 and K2 are obtained according to the engine speed Ne-correction factor K1 characteristic curve shown in FIG. 7 and the engine load-correction factor K2 characteristic curve shown in FIG. 8, respectively, which are set in advance in consideration of characteristics proper to the engine. In FIG. 7, the correction factor K1 is set in such a manner that the correction amount $K_B$ increases from a value of 1.0 with the increase in the engine speed Ne in a region where the engine speed exceeds a certain value. In FIG. 8, the correction factor K2 is set in such a manner that the correction amount $K_B$ decreases from a value of 1.0 with the increase in the engine road in a region where the engine load exceeds a certain value.

Referring again to FIG. 5, in Step S15 for corrective computation, a correction amount $K_B$ fit for the engine cooling water temperature Twt detected in Step S14 is obtained according to the water temperature Twt-correction amount $K_B$ characteristic curve shown in FIG. 6. This correction amount $K_B$ is used to correct the reference fuel injection timing Tinj and the reference ignition timing Tig for the compression-stroke injection mode that are obtained in Step S13 on the assumption that the engine is in a steady-state operation. More specifically, the correction amount $K_B$ is obtained as an advance/retard time indicated by the broken and solid lines in FIG. 6, e.g., crank angles (CA) of 5° and 10°.

Next, in order to correct the advance/retard time $K_B$ in accordance with the engine speed and engine load, the correction factors K1 and K2 are obtained according to the characteristic curves shown in FIGS. 7 and 8, and a correction amount for the optimum fuel injection timing Tinj is determined by multiplying the advance/retard time $K_B$ by the factors K1 and K2.

On this occasion, the ignition timing Tig is set so that a stratified air-fuel mixture formed in the cylinder can be ignited before it diffuses. More specifically, an advance/retard adjustment is effected also for the ignition timing Tig in accordance with the engine cooling water temperature Twt, engine speed Ne, and engine load, in order to secure enough time for the fuel injected at the advanced or retarded injection timing to evaporate fully in the cylinder and securely ignite the fuel, thereby ensuring a stabilized combustion.

In the case where the fuel injection timing is retard-corrected so that the injected fuel may easily run against the cavity 8 formed in the top face of the piston 7, the pressure and air temperature in the cylinder are high at this injection timing, as mentioned before, and the fuel immediately evaporates to cooperate with the in-cylinder air to form an air-fuel ratio mixture. Accordingly, there is no possibility of the injected fuel adhering to the cavity 8 or the like and worsening the combustion.

In this manner, the fuel injection timing Tinj and the ignition timing Tig are corrected for advance or retard in accordance with the engine cooling water temperature Twt, as indicated by the broken and solid lines in FIG. 6, and are further corrected in accordance with the engine speed Ne and the engine load, as shown in FIGS. 7 and 8, whereby the optimum injection and ignition timings are set. Then, the fuel injection control and ignition control for the compression-stroke injection mode are executed at the thus set optimum timings (Step S16). In this case, the ECU 70 functions as fuel injection timing and ignition timing setting means, which includes fuel injection timing and ignition timing correction means, and fuel injection and ignition control means.

Until the fuel injection mode is changed, the engine 1 is operated in the compression-stroke injection mode with the correction amounts varied depending on the change of the engine cooling water temperature Twt and the like.

As mentioned in the above, according to the control apparatus of the present invention, the fuel injection timing Tinj and the ignition timing Tig for the compression-stroke injection mode are corrected in accordance with the engine temperature (engine cooling water temperature Twt) and the like, and the fuel injection control and the ignition control are executed such that an air-fuel mixture having an optimum air-fuel ratio is formed with stability and is then ignited, whereby the fuel injected into the cylinder can be securely burned even at a low engine temperature, e.g., during the warm-up operation immediately after the cold start of the engine.

Figure 13:
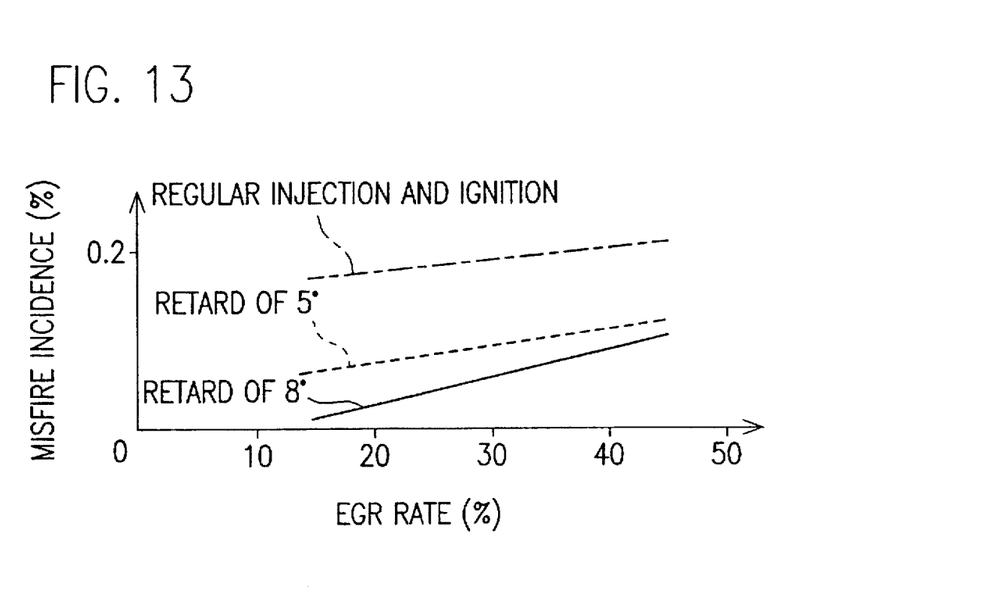
FIG. 13 is a graph showing a misfire incidence reducing effect produced by retard control of fuel injection and ignition timings carried out at a low engine temperature during warm-up operation or the like, by means of the control apparatus according to the second embodiment.
Figure 14:
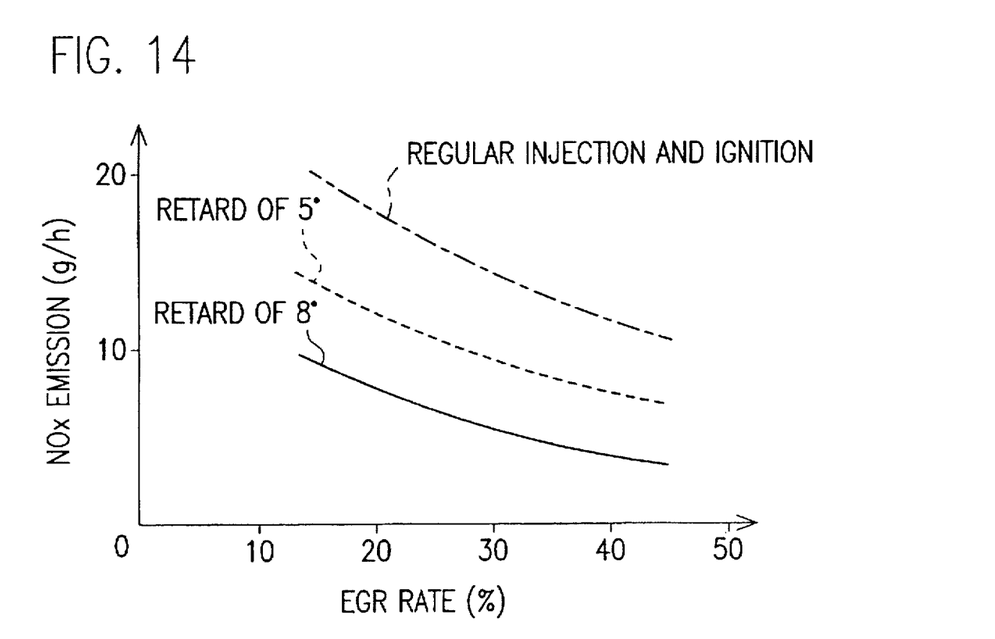
FIG. 14 is a graph showing an NOx emission reducing effect produced by the retard control.

FIGS. 13 and 14 show results of experiments on the incidence of misfire and the amount of emission of NOx. In the experiments, an internal combustion engine having the characteristics shown in FIGS. 9 and 10 was operated in the compression-stroke injection mode at a low engine temperature (35° C.). As seen from FIGS. 13 and 14, the incidence of misfire and the emission of NOx can be suppressed by retarding the fuel injection timing and the ignition timing (e.g., for 5° and 8°) as compared to the case where fuel injection and ignition are carried out at timings calculated on the assumption that the engine is in a steady-state operation that follows the warm-up operation. Thus, even when the engine is in the warm-up operation at a low temperature, an effective engine operation in the compression-stroke injection mode can be achieved by retarding the fuel injection timing and the ignition timing, so that the fuel-efficiency can be improved. The incidence of misfire, for example, can be further restrained by effecting a corrective control of an EGR amount, besides the aforementioned corrective control of the fuel injection timing Tinj and the ignition timing Tig.

The present invention is not limited to the first and second embodiments described in the above.

For example, the advance and retard correction amounts for the fuel injection and ignition timings may be determined according to the specifications of the internal combustion engine and the properties of the fuel. In setting the advance and retard correction amounts, it is necessary only that the maximum value of each correction amount be set so that the fuel injection timing and the ignition timing are within ranges such that the combustion conditions for the compression-stroke injection mode are satisfied. Further, the correction factors K1 and K2, which are based on the engine speed and load, should only be set in accordance with the operation characteristics of the engine. Alternatively, the correction amount $K_B$ and the correction factors K1 and K2 may be obtained from map data that are originated by previously mapping the engine cooling water temperature Twt-correction amount $K_B$ characteristic, engine speed Ne-correction factor K1 characteristic, and engine load-correction factor K2 characteristic on a lookup table and are stored in advance in storage means of the control apparatus (ECU 70). In this case, the ECU 70 functions as correction amount and correction factor storage means and correction amount and correction factor determination means.

It is to be understood that the present invention is not limited to the embodiments described above, and that various changes and modifications may be effected therein by one skilled in the art without departing from the scope or spirit of the invention.

What is claimed is:

1. A control apparatus for an in-cylinder injection internal combustion engine, the engine having a fuel injection device for injecting fuel directly into a combustion chamber and operable in an intake-stroke injection mode where the fuel is injected mainly in an intake stroke and in a compression-stroke injection mode where the fuel is injected mainly in a compression stroke, comprising:

injection mode selection means for selecting an injection mode in accordance with an operating state of the internal combustion engine;

injection timing setting means for setting a reference injection timing, indicative of a fuel injection start or termination timing, in accordance with the injection mode selected by said injection mode selection means, and for correcting the thus set reference injection timing so as to obtain such a fuel evaporation rate and a fuel stratification degree as to ensure stabilized combustion of the fuel injected into the combustion chamber when said injection mode selection means selects the compression-stroke injection mode, the fuel evaporation rate and the fuel stratification degree varying in dependence on an engine temperature; and fuel injection control means for controlling the fuel injection device in accordance with the reference injection timing set or corrected by said injection timing setting means.

2. The control apparatus according to claim 1, further comprising:

temperature detection means for detecting the engine temperature;

wherein said injection timing setting means includes:

correction factor storage means for storing a first correction factor set in advance as a function of the engine temperature and used to obtain the fuel evaporation rate and the fuel stratification degree which permit the stabilized combustion of the fuel injected into the combustion chamber;

first correction factor determination means for determining, from said correction factor storage means, the first correction factor suited to the engine temperature detected by said temperature detection means; and injection timing correction means for correcting the reference injection timing with use of the first correction factor, determined by said first correction factor determination means, when the engine temperature detected by said temperature detection means is equal to or lower than a predetermined temperature.

3. The control apparatus according to claim 2, wherein said first correction factor is set in accordance with an engine characteristic proper to said internal combustion engine, so as to satisfy those requirements for the fuel evaporation rate and the fuel stratification degree which are associated with the stabilized combustion of the fuel injected into the combustion chamber.

4. The control apparatus according to claim 2, wherein said injection timing correction means includes correction restriction means for restricting the correction of the reference injection timing so as to cause the reference injection timing to fall within a range such that execution of the fuel injection in the compression-stroke injection mode is permitted.

5. The control apparatus according to claim 1, further comprising:

temperature detection means for detecting the engine temperature;

wherein the intake-stroke injection mode includes a first injection mode where the fuel is injected in the intake stroke in an amount to permit a mixture supplied to the combustion chamber to have an air-fuel ratio close to a stoichiometric air-fuel ratio, and a second injection mode where the fuel is injected in the intake stroke in an amount to attain the air-fuel ratio which is leaner than that achieved in the first injection mode;

wherein the compression-stroke injection mode includes a third injection mode where the fuel is injected in the compression stroke in an amount to attain the air-fuel ratio which is leaner than that achieved in the second injection mode; and wherein said injection mode selection means selects the first injection mode when the engine temperature detected by said temperature detection means is equal to or lower than a set temperature which is lower than the engine temperature observed when a warm-up operation of the internal combustion engine is completed, and selects the third injection mode when the engine temperature detected by said temperature detection means exceeds the set temperature.

6. The control apparatus according to claim 2, further comprising:

engine rotation speed detection means for detecting engine rotation speed of the internal combustion engine; and engine load detection means for detecting engine road of the internal combustion engine;

wherein said injection timing setting means includes second correction factor setting means for setting a second correction factor in dependence on the engine rotation speed detected by said engine rotation speed detection means; and third correction factor setting means for setting a third correction factor in dependence on the engine load detected by said engine load detection means; and wherein said injection timing setting means corrects the reference injection timing on the basis of the first factor, the second correction factor and the third correction factor.

\* \* \* \* \*